April 13, 1937. J. R. JOHNSON 2,076,894
DEVICE FOR PUTTING ON SKID CHAINS
Filed March 5, 1936
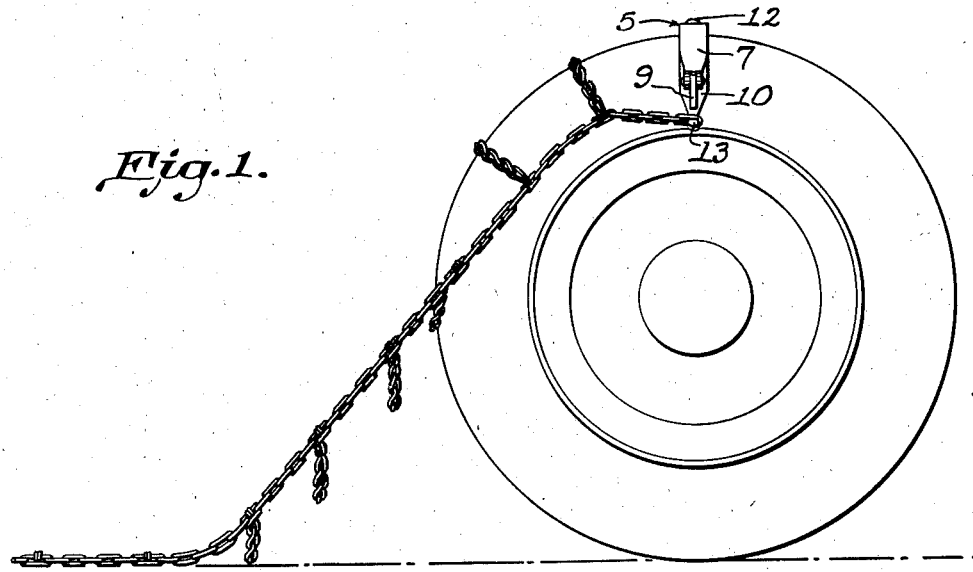
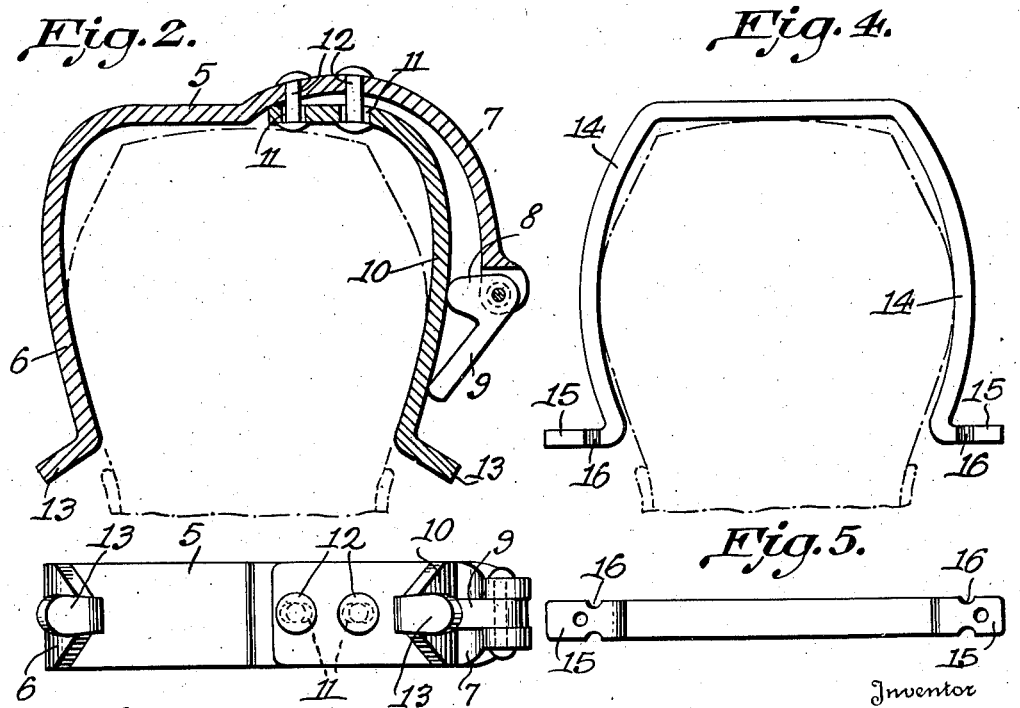
Inventor
Jerald R. Johnson
By C. A. Snow & Co.
Attorneys Patented Apr. 13, 1937

2,076,894

UNITED STATES PATENT OFFICE 2,076,894

DEVICE FOR PUTTING ON SKID CHAINS

Jerald R. Johnson, Pelican Rapids, Minn.

Application March 5, 1936, Serial No. 67,382

1 Claim. (Cl. 152—14)

This invention relates to an anti-skid chain mounting device, the primary object of the invention being to provide means for temporarily holding one end of an anti-skid chain in position on a tire, while the chain is being wrapped around the tire and the ends of the chain are permanently secured, in the usual manner.

Another object of the invention is the provision of a device which may be firmly secured in position on a tire, insuring against the chain becoming disconnected as the wheel is rotated to position the chain over the tire.

A further object of the invention is the provision of a device to which one end of an anti-skid chain may be connected to the end that the chain may be readily mounted without the necessity of using a jack, regardless of whether the vehicle is standing on level ground, snow, mud or sand.

A still further object of the invention is to provide an attaching device having means to clamp the tire on which the device is positioned, to prevent the device from slipping while the chain is being positioned on an under-inflated tire.

With the foregoing and other objects in view, which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

Referring to the drawing:

Figure 1 is an elevational view illustrating a chain applying device, constructed in accordance with the invention, and showing a chain hooked thereto.

Figure 2 is a transverse sectional view through the body portion of the device.

Figure 3 is an end elevational view thereof.

Figure 4 is an elevational view of a modified form of the invention.

Figure 5 is an end elevational view of the modified form.

Referring to the drawing in detail, the device comprises a body portion indicated by the reference character 5, which body portion is constructed of a length of rigid metal substantially U-shaped in formation, and providing a long arm 6 and a substantially short arm 7. The arm 7 is slightly offset, as clearly shown by Figure 2 of the drawing, the free end of the arm 7 being formed with a cutout portion in which the cam 8 is positioned, the cam including a handle 9 whereby the cam may be operated to accomplish its purpose.

The reference character 10 designates a movable arm adapted to cooperate with the arm 6 in gripping a motor vehicle tire. This arm 10 is formed with enlarged openings 11 in which the headed pins 12 are disposed, the headed pins 12 securing the arm 10 to the body portion in such a way as to permit of pivotal movement of the arm 10 with respect to the body portion.

The cam 8 is shown as contacting with the outer surface of the movable arm 10, so that when the cam has been moved to a position as shown by Figure 2 of the drawing, the arm 10 will be forced inwardly contacting with the tire, causing the body portion to securely grip the tire. This type of body portion will grip a tire, should the tire be under-inflated.

It will also be seen that due to this construction, the body portion may be secured to tires of various widths. The ends of the arms 6 and 10 are tapered as clearly shown by Figure 3 of the drawing, and will extend laterally providing fingers 13 of widths to pass into links of the usual anti-skid chain.

In the form of the invention as shown by Figure 5 of the drawing, the body portion is of a one piece construction and embodies a pair of yieldable arms 14 that have their free ends extended laterally as at 15, the side edges of the laterally extended ends 15 being formed with notches 16, so that when the ends 15 are positioned within links of a chain, the links will find their way into the notches 16 preventing the chain from slipping with respect to the body portion.

In the use of the device, one end of an anti-skid chain is connected to the free ends of the arms of the device, the device having been placed over the tread of a tire, in a manner as shown by Figure 1 of the drawing. With one end of the anti-skid chain secured in this manner, the wheel is rotated until it has completed one revolution. This movement brings the free end of the chain to a position adjacent to the end of the chain secured by the device. The usual hooks of the anti-skid chain may now be operated to secure the ends of the chain together around the tire.

Having thus described the invention, what is claimed is:

A tire chain attaching and securing device comprising a U-shaped body portion providing spaced leg members adapted to straddle a tire, one of said legs being offset with respect to the other leg, headed pins extending through the body portion, a movable arm having enlarged openings into which the pins extend loosely securing the movable arm to the body portion directly under the offset leg of the body portion, whereby the movable arm may swing laterally with respect to the body portion, a cam member pivotally mounted at the free end of the offset leg directly over the movable arm, said cam member adapted to move the movable arm into close engagement with the tire gripping the tire on which the device is positioned, and fingers on the ends of the movable arm and one of the leg members whereby a tire chain may be secured to the U-shaped body portion.

JERALD R. JOHNSON.